G. W. BULLEY.
VULCANIZING APPARATUS.
APPLICATION FILED JUNE 10, 1916.
1,380,463.
Patented June 7, 1921.
2 SHEETS—SHEET 1.
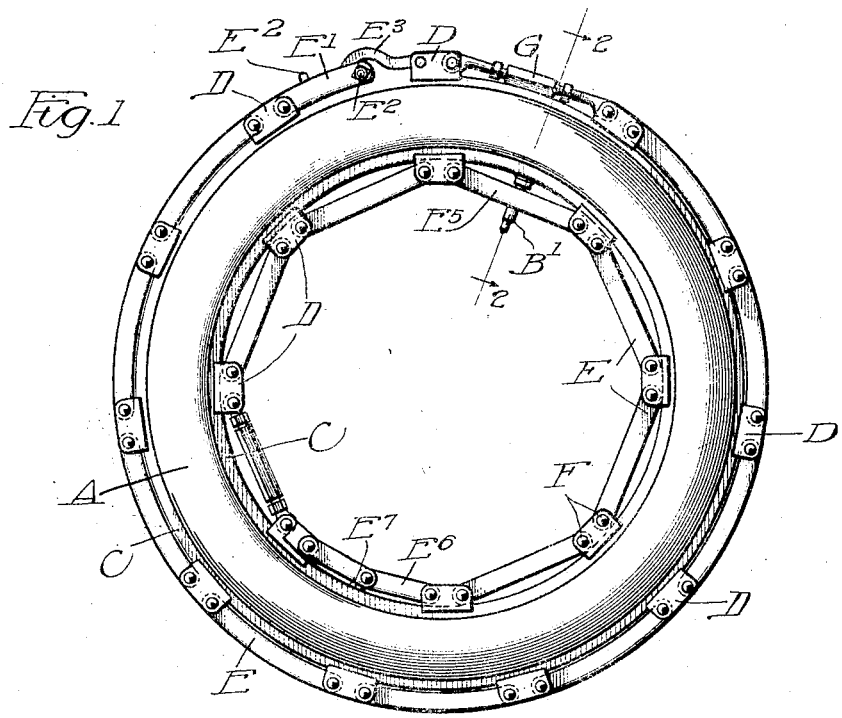
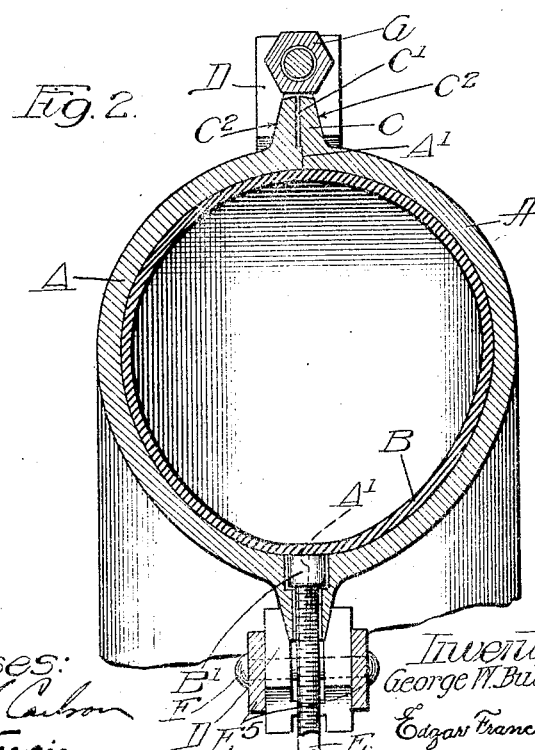
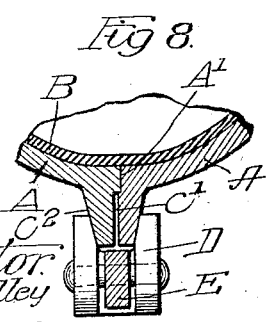

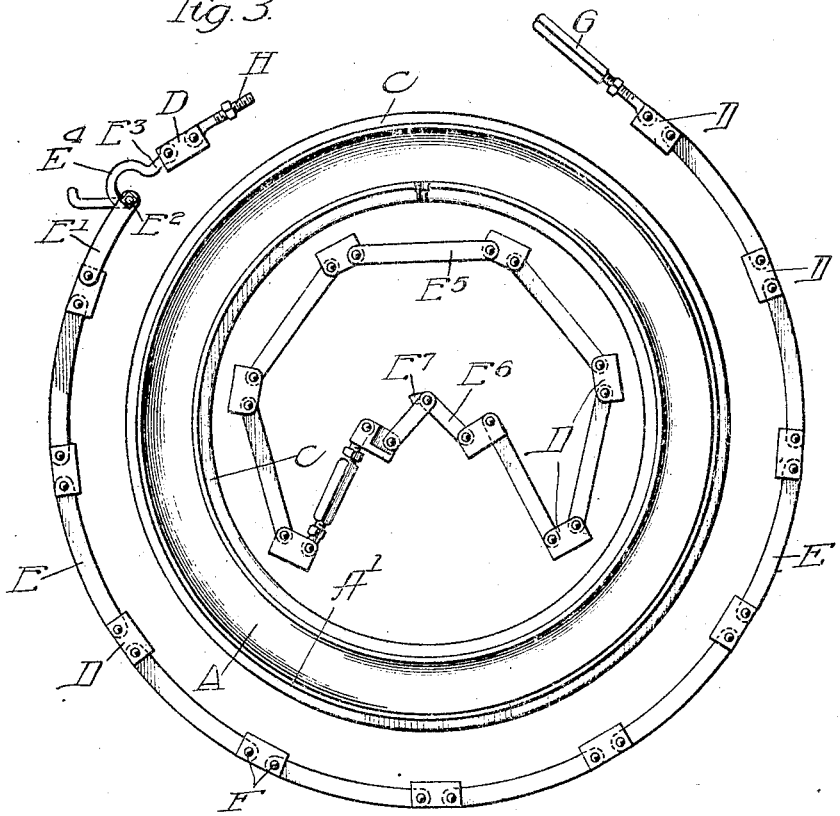
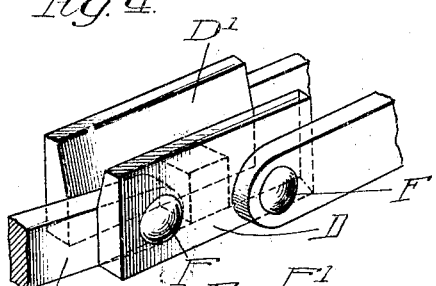
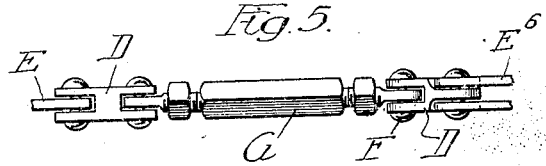
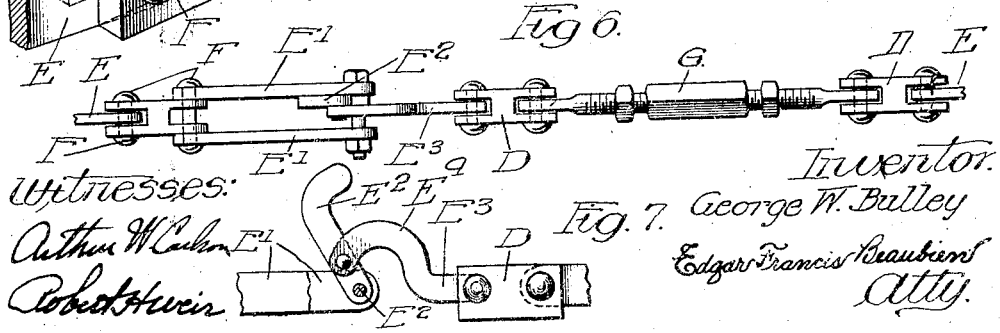

UNITED STATES PATENT OFFICE.

GEORGE W. BULLEY, OF CHICAGO, ILLINOIS.

VULCANIZING APPARATUS.

1,380,463.

Specification of Letters Patent.   Patented June 7, 1921.

Application filed June 10, 1916.   Serial No. 102,868.

*To all whom it may concern:*

Be it known that I, GEORGE W. BULLEY, a citizen of the United States of America, and resident of Chicago, Cook county, Illinois, have invented a certain new and useful Improvement in Vulcanizing Apparatus, of which the following is a specification.

My invention relates to improvements in vulcanizing apparatus, and has more particular reference to improvements in vulcanizing molds for automobile tires and the like.

One of the objects of my invention is to provide an improved device of this character which will be simple, durable and reliable in construction, effective and efficient in operation and inexpensive to manufacture.

Other objects of my invention will appear hereinafter.

My invention consists in the features of novelty exemplified by the construction, combination and arrangement of parts hereinafter described, shown in the accompanying drawings and more particularly set forth in the appended claims.

Referring to the accompanying drawings:

Figure 1 is a view in elevation of an improved tire vulcanizing mold embodying my invention;

Fig. 2 is an enlarged detail transverse section on the line 2—2 of Fig. 1;

Fig. 3 is a view in elevation similar to Fig. 1, showing the flexible clamps released and detached from the mold proper;

Fig. 4 is an enlarged perspective detail of one of the individual clamps and its connections with the chain or flexible carrier in which it is contained;

Fig. 5 is an enlarged detail of the turn buckle adjusting device for the inner clamping mechanism;

Fig. 6 is an enlarged detail of the adjustable turn buckle and the tensioning device;

Fig. 7 is another detail view of the mechanism shown in Fig. 6 in the outer clamping mechanism; and Fig. 8 is an enlarged detail section through a portion of the mold and one of the individual clamps of the outer clamping mechanism.

My invention relates to an apparatus for use in connection with that process known as vulcanizing in which the rubber or other material to be treated is subjected to cooking or curing by the application of heat while the material is contained within a suitable form or mold. The structure which I have shown in the drawings, and by which I have chosen to illustrate my invention, is especially adapted for the treatment of automobile tires. The particular mold shown is designed for use in vulcanizing what are generally known as inner tubes, although it will be understood, of course, that the invention is equally as applicable to the vulcanizing of outer tires or casings for automobile tires. This structure involves two like sections or divisions A which, when fitted together, form a complete inclosure for the tube or tire to be vulcanized. These mold sections are made of suitable material such as steel, and are circular in form to correspond to the annular contour of the usual automobile tire. This mold which, as before stated, is preferably composed of two sections rather than three or a larger number thereof, because two sections are sufficient to enable the tire to be readily inserted in place and removed and constitute a minimum number of parts to handle. The mold, when its two sections are together, is shown as substantially circular for the sake of simplicity of illustration but of course the cross-sectional configuration of the mold depends upon that of the tire or tube to be treated. The mold here shown and described is of the single walled type which, in conjunction with a number of like molds, is adapted to be placed within a suitable chamber or inclosure where they are subjected to the application of heat, the heat being usually supplied through the medium of live super-heated steam. Owing to the fact that in the process of vulcanizing of tires the heat is conveyed to the tire itself through walls of the molds which contains the tire, I have discovered that the success of the process is assured by forming the walls or wall of the mold of substantially uniform thickness and density throughout—that is, in other words, the outer or exterior surface of the mold is disposed concentric with and conforms to the inner or interior surface of the mold to the end that throughout the entire mold the wall thereof is of substantially the same thickness and contains substantially the same quantity of metal. Furthermore I make this uniform wall comparatively thinner than has been usual heretofore. This construction results in a more accurate and uniform temperature regulation, and the mold is more quickly responsive. In practice the heat is conducted to the tire uniformly throughout the entire mold and less time is required to bring the mold to the proper vulcanizing temperature. On the other hand the mold quickly cools when the treatment of the tire is stopped. This is an advantage from the standpoint of the product because, since the cooling of the mold is almost coincident with the end of the vulcanizing treatment, there is no danger of over vulcanization. Aside from the improved uniformity and quality of the tire product, my improved mold involves another advantage. The rapid cooling of the mold enables the mold to be used oftener in a given period of time—that is to say less time is required to remove a treated tire and replace it with a tire to be treated. Consequently, the output of the factory employing these molds is increased considerably. Another advantage attendant upon the construction of mold in the manner above described, is the elimination of all excess metal and the consequent reduction in weight in molds of this character thus making the molds easier to handle, less expensive to manufacture and a reduction in the size of the space occupied by the mold thus enabling a greater number of molds to be put into a given heater space. The two divisions or sections of the mold are identical. The dividing line between the two sections in this case is located in a central plane intersecting the circumference of the mold—that is, the dividing line for both the inner and outer peripheries of the mold is in a plane transverse to the axis of the annulus. In this construction the dividing line or plane of separation of the sections is formed by the abutting edges $A^1$ of the mold sections, as shown more clearly in Figs. 2 and 7. These abutting edges are preferably accurately machined so as to form a tight close fitting joint. The dividing of the mold in sections in this manner is, of course, for the purpose of enabling the tire, represented at B in Figs. 2 and 8, to be readily removed and replaced in the mold. Molds of this character thus require means for fastening and holding the sections together while the tire is being treated. Various types of fastening devices have heretofore been used, such for instance as a plurality of hinged bolts distributed around the mold, but with such fastenings the objection is that each one must be individually operated. The clamping effect on the mold is not uniform, to say nothing of the loss of time required to set up a mold and operate these individual clamps. So far as my improved uniform walled mold itself is concerned, it is obvious that its operation will be the same whether the individual or my improved clamping mechanism is employed or whether the mold, along with a plurality of like molds, is placed in a common clamping mechanism such as the usual hydraulic press. However, I have improved the clamping mechanism for both the inner and outer peripheries of the mold. Each section or division of the mold is provided with a comparatively small flange or rim C which is preferably continuous around the section. In this particular structure I have provided a flange or rim C for each section and for both the inner and outer peripheries thereof. These flanges or rims are preferably located adjacent the plane of separation or dividing line of the two sections and in this case the flanges or rims are substantially flush or coincident with the edges $A^1$ of the sections. When the sections are thus assembled the corresponding flanges are brought close together to form in effect single continuous rims around the outer and the inner peripheries of the mold. These flanges form means which the clamps engage and for this reason they are spaced to provide a slight clearance $C^1$ therebetween so as to insure the tight close fit between the wall edges $A^1$ of the mold sections. The outer or side surfaces $C^2$ of the flanges are tapered or beveled, so to speak, and coöperating with this wedge-shaped rim or flange on the mold are a plurality of small wedge blocks or individual clamps D which are adapted to be distributed around both the inner and outer peripheries of the mold. These little clamping blocks or members have longitudinal grooves, the walls or faces $D^1$ of which are tapered to correspond to the taper or bevel on the mold flanges, as shown in Figs. 2, 4 and 7. Hence when pressure is applied to the clamping members they operate to force and hold the two sections of the mold tightly together. The clamping blocks for each peripheral flange of the mold are assembled together in a flexible clamp carrier or chain, the clamps being pivotally connected to the ends of links E. The links may be attached to the blocks in any suitable manner but in this construction I notch or slot the blocks at their ends for the reception of the ends of the links, and the pivotal connections between the blocks and links are provided by transverse pins or rivets F. These continuous flexible clamping members are preferably provided with at least one adjustable link or part so that the loop may not only be opened if desired but its diameter may be adjusted to the particular conditions. The structure which I find best adapted for this purpose is an ordinary turnbuckle. These consist of hollow threaded sleeves G into the ends of which the threaded bolts or terminal members H are inserted, these terminal members being individually connected to the adjacent clamping blocks in the same manner that the links are connected thereto. Thus these turn buckles may also be used to take up slack or enlarge the diameter as the case may be. In the outer chain I provide two links E¹ spaced apart and individually attached to one of the clamping blocks D and carrying at their other ends a pivoted arm or lever E². The adjacent clamping block D has a single link E³ which is pivoted thereto and also to the lever E² a slight distance from the pivot of said arm E². The link E³ has a curve E⁴ which permits its pivot to be swung past a center line by the arm E², thus forming in a sense a toggle. Thus the lever E² may be operated to draw the outer clamping mechanism tightly into clamping engagement with the mold. Operating the lever in the opposite direction releases the tension and enlarges the loop to such an extent that it may be readily removed and replaced with respect to the mold. In the case of the inner clamping mechanism one of the links is substituted by a toggle E⁶, as shown in Fig. 3. When the clamping mechanism is put in place and the toggle E⁶ expanded it of course enlarges the diameter of the clamping loop sufficiently to exert the proper clamping effect upon the mold. One of the links of the toggle has a small projecting end E⁷ which bears against the edge of the mold flange and holds the toggles in a locking position with its knuckle joint slightly beyond the center. To remove the inner clamping mechanism it is simply necessary to break the toggle as shown in Fig. 3. This releases the compression and enables the entire loop to be collapsed so that it may be readily removed. Thus I have provided clamping devices which, while effectively clamping the mold sections at numerous points around their peripheries, are capable of being handled as units. These clamping mechanisms may be readily put in place as a unit and quickly operated to exert their clamping effect upon the mold, and as quickly operated to release them from the mold, without the necessity of actually opening the loops. The turn buckles provide adjustment so that the toggles may exert their proper effect. This construction very materially reduces the time necessary for the operator to remove and replace tires with respect to the molds. These clamping devices have the advantage of eliminating loss of parts since all of the parts are interlinked. The cost of manufacture is reduced because the parts can all be made as stock parts and the repairs are thus reduced to a minimum.

At some convenient point in the inner clamping device I provide two parallel links E⁵ between two adjacent blocks instead of a single link. This produces a space through which the valve stem B¹ of the inner tube B may project. The stem, as is usual in the construction of inner tubes may be conveniently attached to a source of compressed air for the purpose of supplying air pressure to the interior of the tube to form it against the interior of the tire mold while the tire is being cured.

I claim:

1. In a tire vulcanizing mold, the combination of a hollow annular, imperforate shell of uniform thickness cross-sectionally, said shell being divided circumferentially into two separable sections, inner and outer flanges outstanding from said sections, and inner and outer flexible clamping members having clamps engaging said flanges at intervals around their circumferences.

2. The combination of a plurality of separable mold sections, and a continuous flexible clamp having clamping members at intervals for holding the sections in proper relation.

3. The combination of a plurality of annular mold parts, and a flexible clamp disposed circumferentially around and engaging said mold parts at a plurality of points for holding said parts in assembled relation.

4. In a tire vulcanizing apparatus, the combination of a mold comprising a plurality of annular sections separably assembled and each having a flange in juxtaposition to a like flange on the adjacent section, a plurality of clamping members engaging the flanges, and means for simultaneously operating said clamping members to hold the sections in position.

5. In a tire vulcanizing apparatus, the combination of a mold comprising a plurality of annular sections separably assembled and each having a flange in juxtaposition to a like flange on the adjacent section, a plurality of clamping members engaging the flanges, a flexible carrier to which said clamping members are pivotally attached, and means for actuating said flexible carrier to simultaneously force the clamping members into clamping engagement with the flanges.

6. In a tire vulcanizing mold, the combination of a plurality of annular mold sections having circumferentially disposed annular flanges juxtaposed in relation to each other when the sections are assembled, and clamping members linked together in chain relation and arranged to force the flanges toward each other to clamp the sections together, and means for simultaneously actuating said clamping members.

7. In a tire vulcanizing mold, the combination of a plurality of annular mold sections having annular flanges juxtaposed in relation to each other when the sections are assembled, and a flexible clamping device comprising a plurality of individual clamping members linked together in chain relation and arranged to engage the flanges of adjacent mold sections to clamp said sections in position.

8. In a tire vulcanizing mold, the combination of two annular mold sections separably fitted together at their inner and outer peripheries and having means disposed at intervals around said peripheries for engagement by a clamping device, and a chain disposed around each periphery having clamping members distributed at intervals for engaging said means.

9. The combination of two like annular, hollow, mold sections having wedge shaped flanges adjacent their edges, a plurality of clamping blocks arranged to engage said flanges and clamp the mold sections together, and means for actuating said clamping blocks.

10. The combination of a pair of component, annular mold sections having peripheral, outstanding flanges, a plurality of clamping devices coöperating with said flanges to clamp the sections together, and means for simultaneously actuating said clamping devices.

11. The combination of a pair of component, annular, mold sections separably fitted together at their edges, flanges adjacent said edges arranged when the sections are assembled to form an annular wedge around the mold, a plurality of blocks arranged to bridge said wedge, and having correspondingly wedge-shaped channels for receiving said wedge, and means for forcing the blocks and wedge into engagement to clamp said sections together.

Signed by me at Chicago, Illinois, this 17th day of May, 1916.

GEORGE W. BULLEY.

Witnesses:
E. H. CLEGG,
AMY JEHLE.